(12) United States Patent
Wu

(10) Patent No.: US 7,248,176 B2
(45) Date of Patent: *Jul. 24, 2007

(54) COLOR-CHANGEABLE WARNING APPARATUS OF VEHICLE METER

(76) Inventor: Shih-Hsiung Wu, No. 406, Ding-Ann Street, An-Nan District, Tainan City (TW)

( * ) Notice: Subject to any disclaimer, the term of this patent is extended or adjusted under 35 U.S.C. 154(b) by 190 days.

This patent is subject to a terminal disclaimer.

(21) Appl. No.: 11/049,983

(22) Filed: Feb. 4, 2005

(65) Prior Publication Data

US 2006/0187077 A1 Aug. 24, 2006

(51) Int. Cl.
*G08B 5/00* (2006.01)
(52) U.S. Cl. .................. 340/815.4; 340/461; 340/438; 340/441; 362/61
(58) Field of Classification Search ............... 340/461, 340/438, 441, 815.4, 428, 439, 458, 815.56, 340/815.66; 362/23, 61
See application file for complete search history.

(56) References Cited

U.S. PATENT DOCUMENTS

| | | | | |
|---|---|---|---|---|
| 4,415,855 | A * | 11/1983 | Dubauskas | 324/114 |
| 5,284,108 | A * | 2/1994 | Furuya | 116/286 |
| 5,376,917 | A * | 12/1994 | Yoshimoto et al. | 340/438 |
| 5,636,145 | A * | 6/1997 | Gorman et al. | 702/148 |
| 6,302,551 | B1 * | 10/2001 | Matumoto | 362/27 |
| 6,802,276 | B2 * | 10/2004 | Sugimoto | 116/62.1 |

\* cited by examiner

*Primary Examiner*—Daryl C Pope
(74) *Attorney, Agent, or Firm*—Rosenberg, Klein & Lee

(57) ABSTRACT

A color-changeable warning apparatus of a vehicle meter transforms a measured value of the target position into a first digital signal and adopts a setting value as a second digital signal. The first digital signal and the second digital signal are compared by a comparison program, wherein the parameter comparison result is read by a processing unit so as to trigger a light-emitting device of a light-outputting group to change the outputted light color thereby achieving the warning purpose.

7 Claims, 3 Drawing Sheets

COLOR-CHANGEABLE WARNING APPARATUS OF VEHICLE METER

FIELD OF THE INVENTION

The present invention relates to a color-changeable warning apparatus of a vehicle meter, and more particularly to an apparatus for showing status variation of the vehicle.

BACKGROUND OF THE INVENTION

The increasingly expanded static functionalities and dynamic statuses of the vehicle are displayed by means of measuring meters, for example, a speed meter, an engine speed meter, a fuel meter, an in-vehicle temperature meter, etc. The measuring meters of the general vehicle for showing measurement data are designed to fit for use habit of the driver, wherein all measuring meters are designed in the form of LCD panels, pointer type display panels, or digital simulated pointer type display panels. Consequentially, these measuring meters do not provide eye-catching warning effect for the driver.

A conventional technique discloses an electronic control loop that triggers a RGB light-emitting device by comparing and mixing lights and changes light-projecting sources with different colors by a microprocessor in accordance with setting values of the meters. The driver is aware of various warring messages through variation of the projected lights so as to prevent himself from danger. Accordingly, these pointer type meters achieve the purpose of controlling color.

The microprocessor disclosed in this conventional technique is for receiving pointer-shifting signals and outputting corresponding control programs stored in the memory to the electronic control loop by means of control, operation, etc. However, the function of receiving pointer-shifting signals means that this conventional technique must provide at least one electrical connection to the pointer. Nevertheless, the modern vehicle meter does not necessarily adopt the pointer as its indication tool. It may adopt the digital symbols. Moreover, the function of receiving pointer-shifting signals means that the microprocessor operates in accordance with the received pointer-shifting signals. In case the pointer has a breakdown or a malfunction, the display tool is totally not able to work. Furthermore, this conventional technique does not provide any warning-setting function for a measuring limit of a target position.

SUMMARY OF THE INVENTION

In view of the aforementioned problems of the conventional technique, the present inventor provides a color-changeable warning apparatus of a vehicle meter. The exterior main body of the vehicle meter primarily consists of a meter shell. The color-changeable warning apparatus is a control loop that mounts inside the meter shell. The control loop primarily comprises:

a signal transforming circuit formed on the control loop for electrically connecting with a target position of a vehicle and transforming a measured value of the target position into a first digital signal;

a processing unit electrically connected with the signal transforming circuit for receiving the first digital signal and performing operation and prosecution, the processing unit having a comparison program for comparing the first digital signal with a second digital signal to generate a parameter comparison result, the parameter comparison result being read by the processing unit to trigger at least a light-emitting device of a light-outputting group to change the outputted light color;

the light-outputting group electrically connected to the processing unit and comprising the light-emitting device corresponding to a display machine;

the display machine electrically connected to the processing unit and triggered by the processing unit; and a setting unit electrically connected to the comparison program provided by the processing unit to make an inputted setting value become the second digital signal such that the second digital signal can be set manually, wherein when the first digital signal value is compared with the setting value set in the setting unit, the parameter comparison result is read by the processing unit to trigger the light-outputting group to change the outputted light color for warning a driver.

The other features and preferred embodiments of the present invention will now be described with reference to the accompanying drawings.

DETAILED DESCRIPTION OF THE PREFERRED EMBODIMENT

The content of the present invention will become more apparent for the examiners from the following detailed description when taken in conjunction with the accompanying drawings.

Figure 1:
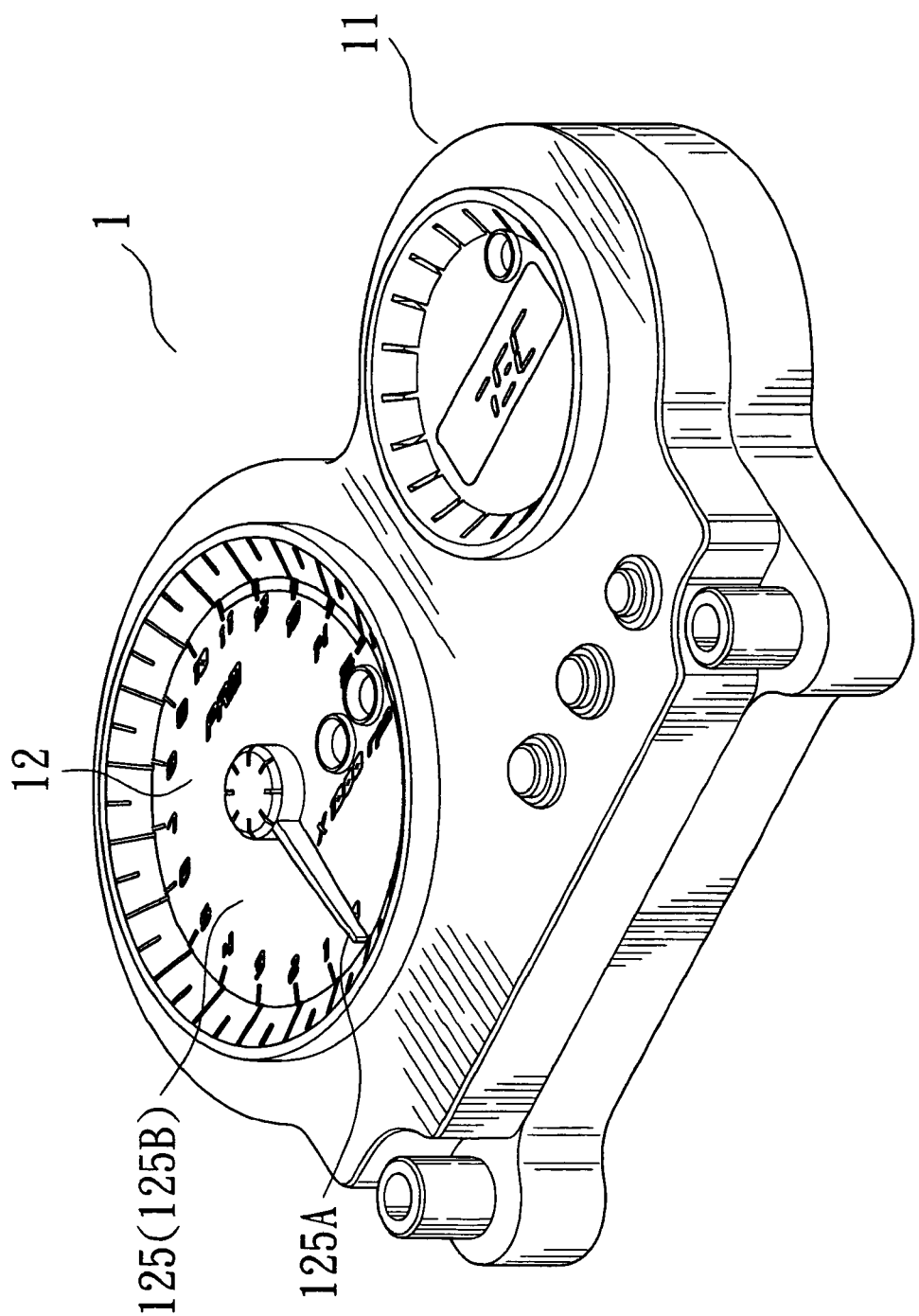
FIG. 1 is an elevation view showing an outward appearance of the present invention.
Figure 2:
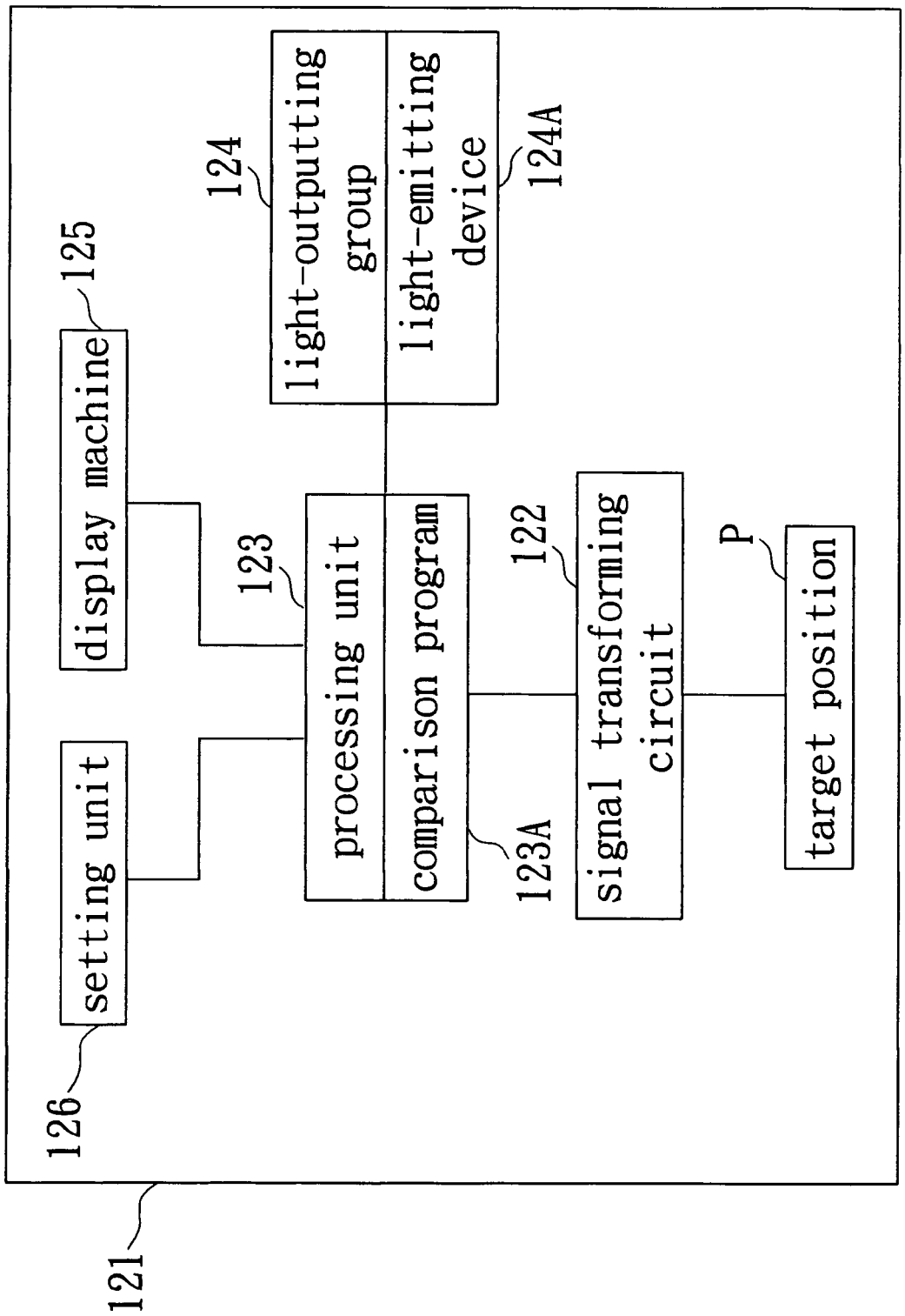
FIG. 2 is a schematic view showing a warning circuit and the working of the warning circuit in accordance with the present invention.

Referring to FIG. 1 and FIG. 2, the present inventor relates to a color-changeable warning apparatus of a vehicle meter. The exterior main body of the vehicle meter 1 primarily consists of a meter shell 11. The color-changeable warning apparatus 12 is a control loop 121 that mounts inside the meter shell 11. The control loop 121 primarily comprises: a signal transforming circuit 122, a processing unit 123, a comparison program 123A, a light-outputting group 124, a light-emitting device 124A, a display machine 125, and a setting unit 126.

The signal transforming circuit 122 is formed on the control loop 121 for electrically connecting with a target position P of a vehicle and transforming a measured value of the target position P into a first digital signal. The so-called target position P may be referred to a wheel axle, the interior of the engine (temperature, rotation rate, etc), and fuel level.

In order to distinguish the present invention from the conventional technique, the target position P of the present invention does not includes the pointer since the pointer is an indication tool not a target position.

The processing unit 123 is electrically connected with the signal transforming circuit 122 for receiving the first digital signal and performing operation and prosecution such as trigger process. The processing unit 123 has a comparison program 123A for comparing the first digital signal with a second digital signal to generate a parameter comparison result. The processing unit 123 is a memory or a chip capable of writing programs. The processing unit 123 reads the parameter comparison result to trigger the light-emitting device 124A of the light-outputting group 124 to change the outputted light color. The first digital signal may be larger or smaller than or equal to the second digital signal. Moreover, it is possible to set other conditions. For example, when 70 km/hr of speed per hour is set to generate warning, a first stage early warning may occur at 65 km/hr to generate a first color and a second stage warning occurs at 70 km/hr to generate a second color.

The light-outputting group 124 is electrically connected to the processing unit 123 and comprises at least one light-emitting device 124A corresponding to a display machine 125. The light-emitting device 124A is capable of changing the outputted light color. The light-emitting device 124A of the light-outputting group 124 is a RGB light-emitting device. In other words, the light-emitting device 124A can emit a monochromatic light or a hybrid chromatic light selected from a red light, a green light, and/or a blue light.

The display machine 125 is electrically connected to the processing unit 123 and triggered by the processing unit 123. The display machine 125 may be a LCD panel, a pointer display panel, or a digital simulated pointer type display panel. In the present invention, the pointer 125A and the meter dial 125B are exemplarily illustrated.

The setting unit 126 is electrically connected to the comparison program 123A provided by the processing unit 123 to make an inputted setting value become the second digital signal. The setting unit 126 is a setting button.

Figure 3:
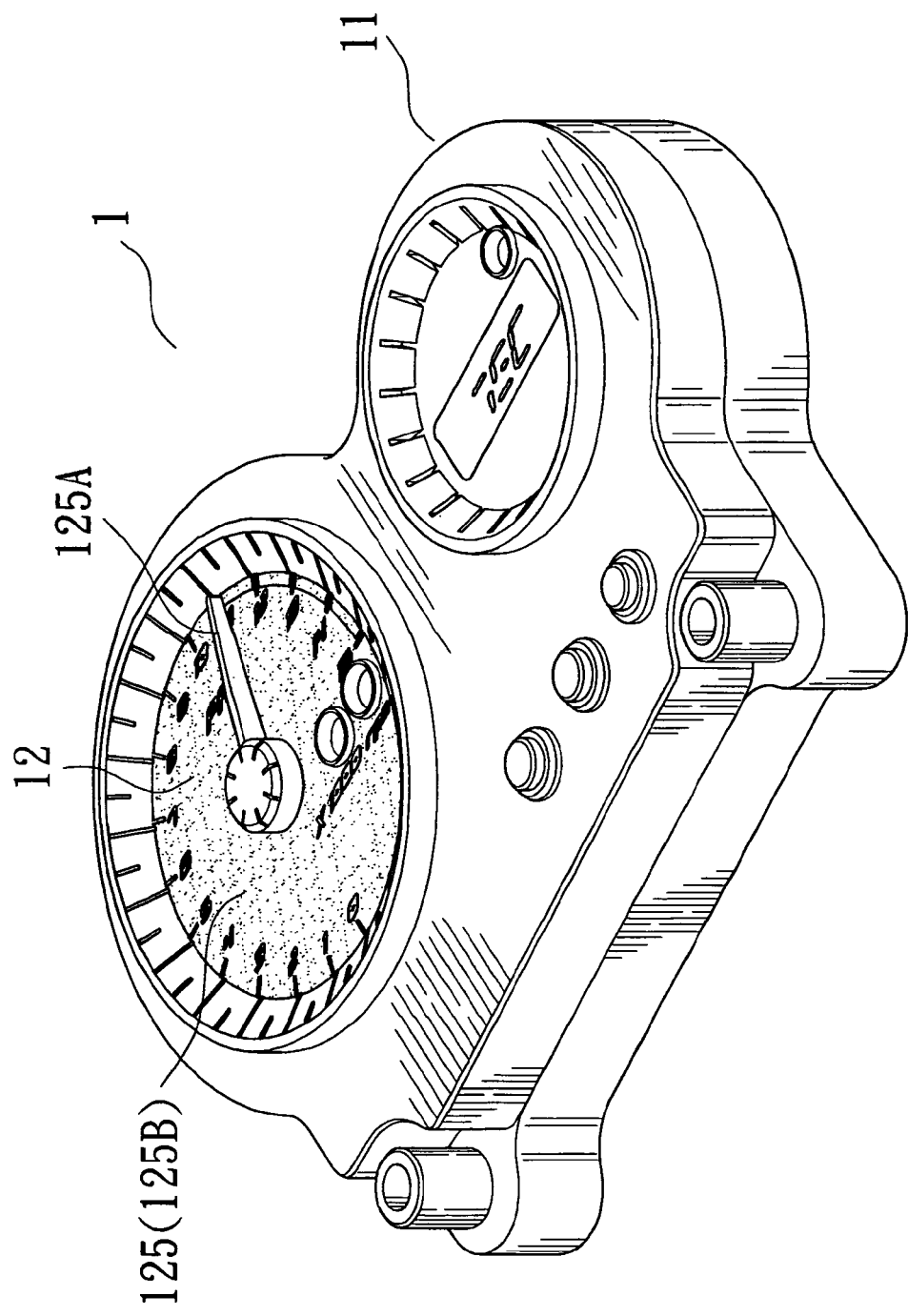
FIG. 3 is a schematic elevation view showing the working of the present invention.

As shown in FIG. 3, the second digital signal can be set manually. When the first digital signal value is compared with the setting value set in the setting unit, the parameter comparison result is read by the processing unit 123 to trigger the light-outputting group 124 to change the outputted light color for warning a driver.

In conclusion, the present invention compares the first digital signal and the second digital signal and provides the parameter comparison result for the processing unit so as to trigger the light-emitting device of the light-outputting group to change the outputted light color for providing a driver with obvious notice and warning.

In view of the description above, the present invention satisfies requirements for patentability namely utility, novelty, and nonobviousness. It is therefore submitted the present invention for a patent.

With the invention thus explained, it is apparent that various modifications and variations can be made without departing from the scope of the invention. It is therefore intended that the invention be limited only as indicated in the appended claims.

What the invention claimed is:

1. A color-changeable warning apparatus of a vehicle meter, wherein an exterior main body of the vehicle meter consists of a meter shell and the color-changeable warning apparatus mounted inside the meter shell is a control loop, the control loop comprising:

a signal transforming circuit formed on the control loop for electrically connecting with a target position of a vehicle and transforming a measured value of the target position into a first digital signal;

a processing unit electrically connected with the signal transforming circuit for receiving the first digital signal and performing operation and prosecution, the processing unit having a comparison program for comparing the first digital signal with a second digital signal to generate a parameter comparison result, the parameter comparison result being read by the processing unit to trigger at least a light-emitting device of a light-outputting group to change the outputted light color;

the light-outputting group electrically connected to the processing unit and comprising the light-emitting device corresponding to a display machine;

the display machine electrically connected to the processing unit and triggered by the processing unit; and a setting unit electrically connected to the comparison program provided by the processing unit to make an inputted setting value become the second digital signal such that the second digital signal can be set manually, wherein when the first digital signal value is compared with the setting value set in the setting unit, the parameter comparison result is read by the processing unit to trigger the light-outputting group to change the outputted light color for warning a driver.

2. The color-changeable warning apparatus of the vehicle meter of claim 1, wherein the display machine is a LCD panel.

3. The color-changeable warning apparatus of the vehicle meter of claim 2, wherein the LCD panel is a digital simulated pointer type display panel.

4. The color-changeable warning apparatus of the vehicle meter of claim 1, wherein the display machine is a pointer display panel.

5. The color-changeable warning apparatus of the vehicle meter of claim 1, wherein the light-emitting device of the light-outputting group is a RGB light-emitting device.

6. The color-changeable warning apparatus of the vehicle meter of claim 1, wherein the target position is a wheel axle.

7. The color-changeable warning apparatus of the vehicle meter of claim 1, wherein the setting unit is a setting button.

* * * * *